Jan. 30, 1923.

G. DONHAM.
MULTIPLE ROLLER ELECTRIC TRANSMISSION TROLLEY.
FILED DEC. 20, 1921.

WITNESSES
A. L. Lomba
J. J. Manning

Grant Donham INVENTOR

Jan. 30, 1923.

G. DONHAM.
MULTIPLE ROLLER ELECTRIC TRANSMISSION TROLLEY.
FILED DEC. 20, 1921.

WITNESSES
A. L. Lomba
J. J. Manning

Grant Donham  INVENTOR

Patented Jan. 30, 1923.

1,443,873

UNITED STATES PATENT OFFICE.

GRANT DONHAM, OF OAKLAND, CALIFORNIA.

MULTIPLE-ROLLER ELECTRIC TRANSMISSION TROLLEY.

Application filed December 20, 1921. Serial No. 523,728.

*To all whom it may concern:*

Be it known that I, GRANT DONHAM, a citizen of the United States of America, residing at 721 60th Street, Oakland, in the county of Alameda and State of California, have invented certain new and useful Improvements in a Multiple-Roller Electric Transmission Trolley, of which the following is a specification.

The main object of this invention is to provide for a highly efficient and non-fluctuating transmission contact, thus insuring various important features heretofore unknown and absent in all present styles of trolley as follows:

That it successfully travels in either direction, without manual effort or attention;

That it can pass along any trolley intersection, crossing or intermittent trolley wire section with bumps or uneven surfaces, with an absolute constancy of contact in a yielding manner;

That is will assure absolute control, manipulation or regulation of the electric current between the power source and the motors and other apparatus of current consumption;

That it will prevent the make and break of said electric current caused by the vibration of a single contact trolley, which is so destructive to all apparatus using said current;

That it will also greatly add to the life and endurance of the costly copper and other conductive trolley or transmission power lines by minimizing arcing and flashing of the electric current as occurs between a single vibrating trolley wheel or roller and the trolley wire, thus burning and roughing its contract surface; that it will eliminate or minimize the noisy flashing and flickering of the lights of cars or apparatus using current supplied by such trolley.

That it will eliminate danger to operators or workmen handling or working on or about said trolley while in contact with the high voltage trolley wire, as there is no current flowing through or into any part or portion of the trolley frame or structure, it being at all times confined to the outer portion of the rollers and insulated brushes connecting thereto and through an insulated cable conductor to a secluded place on the car for distribution. That there are no high resistance contacts where a strong current is made to pass through a small contact surface or oiled journals or bearings which are the most unfavorable conditions for an electrical current transmission. With other objects that will hereinafter appear the invention consists of parts and the construction, combination and arrangement of parts as hereinafter more fully described and claimed, having reference to the accompanying drawings in which Fig. 1 shows a side elevation of the upper portion of the trolley device.

Figure 1:
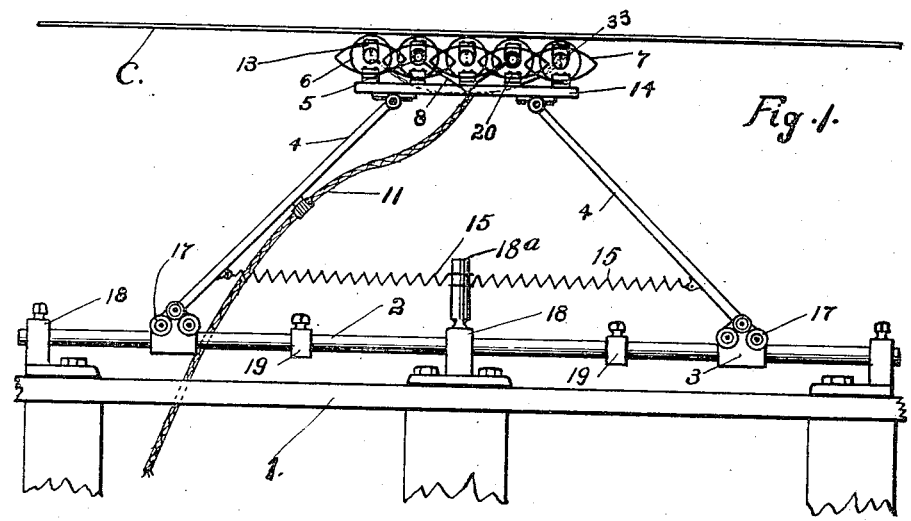
Figure 3:
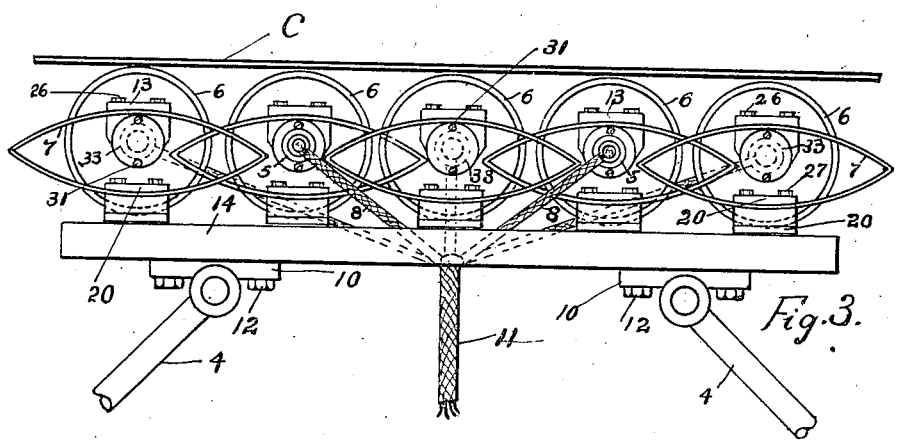
Fig. 3 shows a side elevation of the trolley rollers illustrating their spring mounting.
Figure 4:
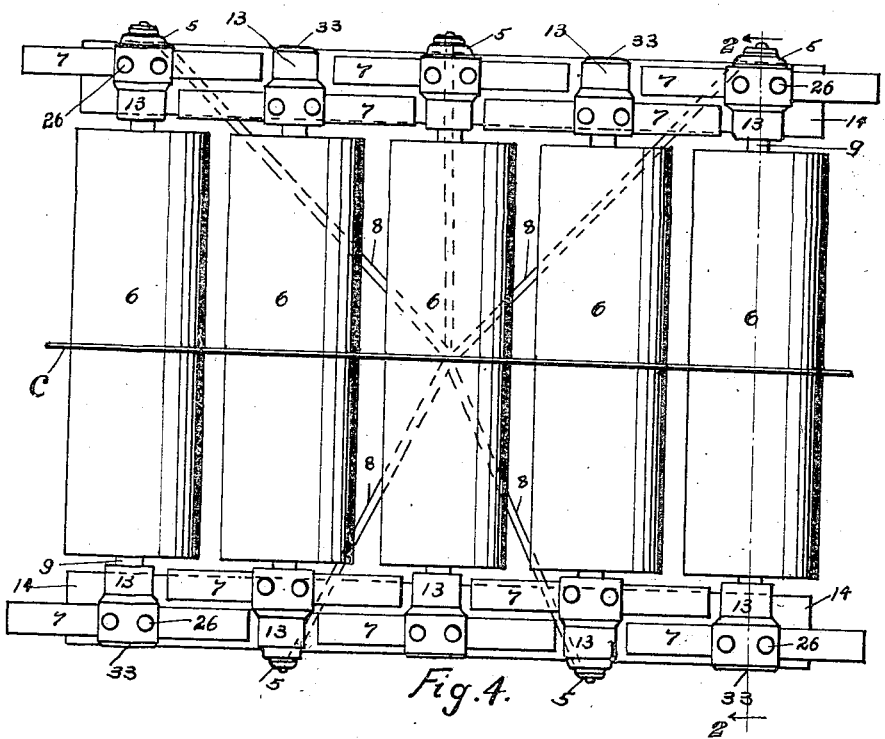
Fig. 4 shows a plan view of the rollers and the mounting therefor.

The form of invention illustrated in the drawings comprises a base 1 which is adapted to be attached to the roof or top of a car. Mounted in brackets 18 upon the base are horizontal rods 2, one at each side of the base. Carrying arms 4 are hingedly mounted at their lower ends to slidable members 3, which members are provided with rollers 17 for travel upon the rods 2. The carrying arms at their upper ends are connected to cross bars 21 and lugs 10, said lugs being securely fastened by bolts 12 to upper frame struts 14. Upon the frame struts 14 are carried a series of rollers 6 having shafts 9 mounted in journals 13 by ball bearings 32. The shafts 9 are insulated from the roller surfaces 6 by means of fiber webs 25, and the journals 13 are supported on struts 14 by means of elliptical springs 7 fastened to said struts by spring clips 20 and bolts 27. As shown in Figs. 3 and 4, each roller with its journals and supporting bearings, constitutes an independent unit and is provided with individual spring mounting so that a detailed description of one roller will apply to the others.

From the roller surface 6 a conductor in the form of a screw 16 extends to the center of the roller shaft 9 where it connects with a conductor plug 23 extending out through the adjacent end of the roller shaft, being insulated therefrom by an insulator 22. This conducting plug has a head which makes contact with a brush 24 carried by a spring 28 connected with a binding screw 29. This screw is mounted in an insulated cap 5 fastened by screws 31 to the adjacent journal bearing 13. A cable 8 is connected by nuts 30 to the binding screw 29 and extends to the approximate center of the roller assembly where it connects with a main conductor cable 11, which leads to the motors of the trolley car.

Figure 2:
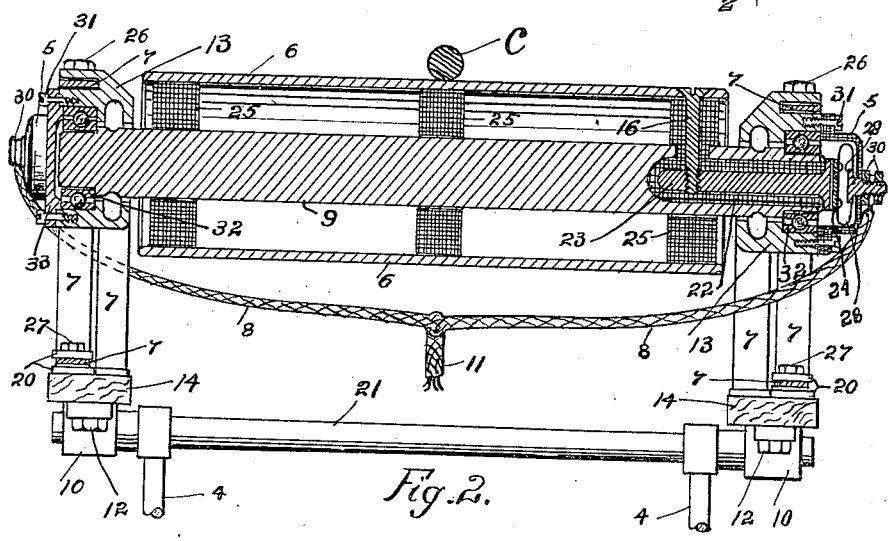
Fig. 2 shows a sectional view through one of the rollers taken on the line 2—2 of Fig. 4 looking in the direction of the arrows.

It is to be noted that each roller has its individual cable 8 leading to the main conductor cable and that alternate rollers have the cable leading out from one end, whereas intermediate rollers have their cables leading from the opposite end, thus giving a sort of X-shaped arrangement of the cables as shown in Fig. 4. The two cables 8 shown in Fig. 2 lead from the ends of different rollers. The non-transmittive ends of the rollers are closed by covers or caps 33.

Over the base of each carrying arm is connected a spring 15 which extends inwardly to a lug 18$^a$ on the center bracket 18. These springs serve to draw the lower ends of the carrying arms inwardly, thus raising the roller assembly into contact with a trolley wire C.

In the operation of the device the surface of at least one roller will always be in contact with the trolley wire on account of the individual spring mounting for the series of rollers. Current will be conducted from the wire through the screws 16, plugs 23, brushes 28 and connected cables. Should any irregularity be encountered in the trolley wire, such as would interrupt electrical contact between the wire and any particular roller or rollers, then one or more of the remaining rollers will be certain to be in proper contact with the wire, thus insuring a constant flow of current.

Having named and described the above mentioned parts in reference to their numbers, the important feature and functions, as well as the means and ways for conducting and transmitting the electric current through its insulated path will be described as follows:

To provide for a multiple contact or multiple roller trolley in such a manner that each or any of the said rollers may transmit all the current required while the remainder of said rollers may be passing along an intermittent or neutral trolley wire space or that the rollers may perform the full required function independently, individually, or unitedly.

To provide for a double or dual spring functioning of the whole or part of the said trolley or trolley mechanism thereof by means of a main or common spring action of the trolley form proper acting in a primary capacity and a secondary spring arrangement that will act separately or individually upon the said rollers. However, that the tension or the spring pressure of all of the primary springs involved shall in their aggregation be equal to the tension or spring pressure of all the secondary springs unitedly so that the general vertical deviations in the trolley wire may be absorbed and followed by the said primary spring action, and the shorter irregularities, depressions or bumps in the trolley wire may be sensitively absorbed by the independent and individual action of secondary spring action and without imparting any vibration to the trolley structure or interfering with its general equilibrium.

To provide for a trolley or trolley construction in such a manner that no part of the frame structure journals, oiled shafts, or main or auxiliary springs are electrically charged with electric current or used as a current transmitting conductor, so that the flow or transmission of all the current is strictly confined to the outer and insulated annular portion of the trolley roller or rollers and from those in and to the common place where it is distributed, regulated and consumed in its various ways throughout the car or number of cars through an entirely and absolutely insulated path such as rollers 6, screws 16, conductor 23, brush 24, spring 28, binding bolt 29, cables 8, main cable 11, and thereon, to place above mentioned.

To provide for a substantial well balanced trolley and trolley structure that can be applied to street cars or other electric traction apparatus that operates in either or both directions, without attention or manipulation, highly efficient, sensitive and non-fluctuating in its transmission of current, eliminating all topheavy, wobbly, or infirm construction by providing for a broad foundation and a small condensed upper portion, simultaneously insuring wide range of vertical movement with great flexibility and anti-frictionally movable parts of rigid but light construction.

It being similarly understood that the materials and finish of the several parts employed may be such as the best experience and judgment of the manufacturer may dictate or as varying conditions may warrant.

Having thus described my invention, what I claim and desire to secure by Letters Patent is:—

1. In a trolley of the character described, a collapsible frame structure and a number of journaled and yieldably mounted trolley rollers carried by said frame.

2. In a trolley of the character described and consisting of a base frame, an intermediate collapsible frame, a secondary frame, and a number of trolley rollers yieldably mounted on said secondary frame.

3. In an electric current transmission trolley of the class described, a base frame structure mounted on a traction car, a set of stanchions or arms each having one of their ends slidably mounted on the said base frame, their other ends hingeably mounted on a secondary frame, a spring arrangement acting upon said stanchions or arms, an additional spring arrangement mounted to said secondary frame structure to act individually upon each of said trolley rollers, and means for conducting or transmitting electric current from each of said rollers.

4. In a trolley of the class described, a frame structure consisting of a normally fixed base portion, intermediate armlike members mounted slidably to the base portion at one of their ends and at their other ends supporting a secondary frame portion, spring supported rollers carried by said secondary frame, and a primary spring means so fastened to said arm-like members to move the secondary frame structure upwardly with an aggregate force or tension to normally deflect or distort the collective and united roller supporting springs when said trolley rollers are all in full contact with the trolley wire.

5. In a trolley structure of the class described, a spring-actuated, articulated frame structure, a number of individual spring supported trolley rollers, and means for receiving electric current from the extreme outer or trolley contact portion of each of said rollers while the same are in contact with the trolley wire.

6. In a trolley mechanism of the class described, a primary and a secondary spring action in and on said mechanism, a set of trolley rollers journaled and conductively mounted on said mechanism, and means allowing said rollers to move to and fro in a vertical upward or downward direction individually or collectively, said movement being differentially controlled by said spring actions.

7. In an electric current transmission trolley structure of the class described, a base frame including rails, intermediate arm or stanchion members having one of their ends hingeably mounted to junction members with anti-friction rollers journaled to said junction members which unitedly roll on or over said base rails, and the other ends of said arms or stanchions hingeably mounted to a secondary frame structure and holding said arm extremities at a fixed distance in relation to each other while their other ends with their junction members may vary their relative distance along or in a parallel direction with said rail base, and adjustable stops on said rails.

8. In a transmission trolley consisting of articulated frame members mounted on a car, a spring arrangement acting thereon to move said frame members, another spring arrangement to move trolley rollers individually or independently of each other in a vertical or upward direction limited to a lesser distance of travel than that of the first spring arrangement, and means providing for an insulated electrical path for the current independently of the frame structure for conducting the said current from the trolley wire to the place of consumption.

9. In an electric transmission trolley consisting of a set of trolley rollers, means providing for an individual and independent spring action on said rollers, means for electrically insulating the outer annular or peripheral portion of each of said metal rollers from their shafts or spindles, their journals and from the entire frame structure, and means for transmitting and conducting the electric current through an insulated path from the metal roller peripheries to a distribution point.

10. In an electric trolley of the class described, a multiple set of trolley contact rollers mounted on said trolley, a multiple set of springs on said rollers, and means for collecting and conducting electric current from insulated shaft conductor tips by insulated brushes contacting thereon, and from said brushes by insulated flexible cable conductor branches to insulated flexible cable conductor junctions and thereon to the various fixtures on the apparatus for consumption.

11. In a trolley mechanism, a roller-carrying member, spring mechanism for keeping the roller carrying member in elevated position and a plurality of rollers journaled on the roller carrying frame and an individual frame mounting for each of said rollers.

12. In a trolley mechanism, a roller-carrying member, spring mechanism to keep said member in elevated position, a plurality of rollers on the roller carrying member and a spring mounting for said rollers permitting each roller to yield independently of the other.

13. In a trolley mechanism, a roller-carrying member, spring mechanism to keep said member in elevated position and a series of rollers journaled on said roller-carrying member and means for receiving electric current from the extreme outer or trolley contact portion of each of said rollers while the same are in contact with a trolley wire.

14. In a trolley mechanism, a trolley roller comprising a conducting surface, a shaft insulated therefrom, bearings for the ends of said shaft, a conductor plug extending into one end of said shaft and insulated therefrom, a screw extending from the conducting surface of said roller into contact with the plug in the shaft and a conductor cable electrically connected to said plug.

15. In a trolley mechanism, a trolley roller comprising a conducting surface, a roller shaft insulated therefrom, bearings for said shaft, a conductor plug extending into one end of said shaft and insulated therefrom; a screw extending from the conducting surface into contact with the plug; an insulated cap on the bearing covering the end of the shaft, a brush supported by said cap and contacting with the plug and a cable electrically connected to said brush.

In testimony whereof I affix my signature.

GRANT DONHAM.